United States Patent [19]

Horney et al.

[11] 3,720,606

[45] March 13, 1973

[54] DEODORIZING AND SEWAGE TREATMENT FORMULATION

[75] Inventors: Ronald E. Horney, Summerfield; Hiram T. Jackson, Greensboro, both of N.C.

[73] Assignee: Biogenics Company, Inc., Greensboro, N.C.

[22] Filed: Feb. 18, 1971

[21] Appl. No.: 116,606

[52] U.S. Cl..................................210/11, 210/59
[51] Int. Cl..................................C02c 1/40
[58] Field of Search.....252/522; 424/76; 210/11, 59, 210/64

[56] References Cited

UNITED STATES PATENTS

| | | | |
|---|---|---|---|
| 3,376,219 | 4/1968 | Silvey | 210/11 |
| 2,858,939 | 11/1958 | Corliss | 4/10 X |
| 2,742,321 | 4/1956 | Mina et al. | 424/76 X |
| 2,793,973 | 5/1957 | Cheronis | 424/76 |

FOREIGN PATENTS OR APPLICATIONS 540,952  11/1941  Great Britain..................210/15

Primary Examiner—Michael Rogers
Attorney—Hunt, Heard & Rhodes

[57] ABSTRACT

A formulation comprising an aqueous solution containing one or more aerobic, mesophilic, spore-forming bacterial agents selected from Group I of the genus Bacillus to induce aerobic decomposition of odor causing waste matter to a form free of odor; and an odor suppressing agent including a perfumant initially effective to suppress and/or mask any undesirable odors that might be released by the waste materials before and during decomposition thereof, and a carrier containing an emulsifier into which the perfumant is dissolved.

5 Claims, No Drawings

DEODORIZING AND SEWAGE TREATMENT FORMULATION

BACKGROUND OF THE INVENTION

The present invention relates to the problems of controlling odor emanating from sewage, and other odor causing organic waste and matter. The ultimate object in treating such odor causing waste is to reduce it through chemical, physical, bacteriological or other means to a form substantially free of undesirable odor. If untreated, the waste will naturally decompose over a long period time, and, depending on the type of bacteria attacking it, will either give off a noxious odor or decompose relatively free of odor. Anaerobic bacteria will reduce matter, giving off a resulting odor, while aerobic decomposition is relatively non-odorous.

One area in particular in which the problem of undesirable odor exists deals with sewage collection and disposal at outdoor events and locations where a large number of people gather in a location unequipped with modern sewage disposal facilities. Frequently the event is of a type, such as a construction site, where the need for sewage disposal facilities arises before adequate facilities can be furnished. However, in the case of some types of athletic events and other outdoor activities of a temporal nature, the provision of adequate permanent sewage disposal facilities to accommodate a large crowd that gathers once or only infrequently at that particular location would not be feasible. Yet, in situations of this type the accumulation of sewage and other odor producing matter and the treatment thereof in a manner unoffensive to the environment must be accomplished.

One solution to the problem associated with such occasional outdoor events involves the use of portable toilets, whereby a waste collection tank is housed in an inexpensive, portable enclosure. As waste matter accumulates in the collection tank, a pumping truck is brought to the toilet for emptying and servicing thereof, or the toilet can be transported to a service area to be emptied and readied for use at the same or a different location. A whole industry has grown up around the furnishing and servicing of these temporary fixtures.

While this system does provide a solution to the collection and disposal problem, it has some disadvantages also, one of which is the formation of undesirable odors caused by the accumulation of decomposing waste matter in the toilet collection tanks between emptying and servicing thereof. Attempts have been made to solve this problem by adding odor suppressing agents to the collection tank to mask the unpleasant odors. This has not been entirely satisfactory, however, because eventually the combination of the masking agent with the unpleasant odors frequently produces an even more unpleasant odor. Also, known masking agents have a relatively short span of effectiveness while the underlying cause of the unpleasant odor, the waste matter, until thoroughly decomposed, remains a possible source for emitting unpleasant odors.

As an alternative solution to this problem, the product formed by a fermentation of animal excrement has been suggested as an additive to waste materials, for suppressing somewhat the formation of noxious odors. See, for example, U. S. Letters Patent to Hahn et al., U.S. Pat. No. 3,227,648, which discloses the use of such an additive in portable toilets to reduce or suppress the development of noxious odors therein.

The additive of Hahn, while having certain biological life or materials or both of them therein, is made from a fermentation process wherein the excreta from cud-chewing, milk producing animals are treated under conditions of controlled temperatures in digesting tanks for periods of up to several weeks. The end product of this process is diluted with water to form the additive, of which, according to the specification of the Hahn patent, the exact chemical and/or biological contents are not fully understood.

Therefore, the formulations and methods presently in use for the treatment of sewage and other odor causing matter to suppress the odors associated therewith generally depend on either masking the odor or reducing the material over a period of time to a form free of odor. Those formulations and methods adapted to mask or cover the undesirable odor tend to wear out through use, while the source of the odor remains. On the other hand, additives used to implement the reduction of waste materials into a form free of odor, fail to cover up odors that are initially emitted from the waste material before the reduction thereof. Furthermore, the use of such additives is generally dependant upon the availability of excreta from certain animals and a somewhat involved fermentation process thereof.

SUMMARY OF THE INVENTION

The present invention concerns a novel formulation for the treatment of odor producing organic matter. In essence the formulation combines the features of an improved odor suppressing or masking agent with a novel bacterial agent, the latter of which induces aerobic decomposition of the odor producing matter to a form free of odor. The odor masking agent includes a perfumant dissolved in a film-forming carrier to form a barrier or shield between the odor producing matter and the atmosphere. Emulsifiers, surfactants, dyes and other additives may be added to the carrier or bacterial agent depending on the end use thereof and the nature of the matter to be treated.

More specifically, the bacterial agent portion of the formulation includes one or more types of aerobic, mesophilic, spore-forming bacteria, belonging to Group I of the genus *Bacillus;* for example *Bacillus megaterium* and/or *Bacillus subtilis*. More than one species of bacteria from this genus is preferably used in the formulation to provide an overlapping temperature range so that one or the other species of the bacteria will grow well at all temperatures between at least 68° and 122° F. Within the overlapping temperature range all the bacteria will grow relatively well, thereby providing a temperature range within which maximum bacterial activity will be experienced. It is desirable, therefore, to select bacteria providing a broad temperature range that will approximately parallel the seasonal temperatures expected to exist in connection with the unpleasant odor producing matter and that will have a more limited overlapping temperature range approximating the prevailing temperatures to be expected.

The odor suppressing agent, which as hereinbefore stated, masks any undesirable odors existing before and during decomposition of the odor producing matter to a form free of odor, includes a perfumant dissolved in a solvent carrier. While a combination of amyl acetate and methyl salicylate has been found to be satisfactory as a suitable perfumant, other agents can be used, including such floral type perfuming agents as benzyl acetate, coumarin, linalool or eugenol as well as such camphoraceous types as camphor and isobornyl acetate. Anthranilic acid or beta-naphthyl ethyl ether may also be used.

The barrier forming solvent-carrier in which the perfuming agent is dissolved preferably comprises an oil, usually a vegetable oil, although a mineral oil can be used. When the formulation is used in a portable toilet or other device wherein a collection tank partly charged with water is used to accumulate waste matter or other odor producing matter, the oil will spread upon the surface of the liquid forming a film thereon, carrying the odor suppressing or covering agent along.

The results that are accomplished, therefore, are believed to be two-fold. First, that the oil film forms a shield or barrier on the liquid's surface and sequesters the odor causing matter contained therein, thereby reducing the opportunity for undesirable odors to be released to the atmosphere. Secondly and, at the same time, the odor suppressing or covering agent dissolved in the oil either assists the oil type barrier in suppressing the emission of undesirable odors or itself releases a pleasant scented odor to the surrounding area or the both.

When the foregoing situation is not the case, that is when a mixture of the formulation is used under circumstances in which the odor causing matter is not collected in a liquid medium, the result obtained is believed to be substantially the same. For example, when the formulation in slightly modified form is used on raw garbage in a receptacle, it is believed that the oil constituent tends to form a film type barrier that covers the odor causing matter, sequestering it in substantially the same manner as discussed in the preceding paragraph.

Examples of oils useful as solvent carriers are cottonseed oil, peanut oil, soy bean oil and to a lesser extent, linseed oil. These oils are preferable to mineral oils, in that they tend to emulsify to a greater extent than mineral oils, however mineral oils can be used satisfactorily.

Glycerol may also be used in the formulation as an emulsifying agent to aid in suspending the perfuming agent in solution. Other emulsifying agents that could be used include long chain fatty alcohols such as lauryl alcohol or dodecyl alcohol, as well as esters of long chain fatty acids such as methyl stearate or methyl oleate. Methylated tallow is also useful in this connection. Other additives comprising conventional emulsifying agents, available from many commercial chemical suppliers can be useful in encouraging emulsification.

It is to be recognized that since the bacterial agent is suspended in an aqueous solution, which is heavier than the oil base odor suppressing agent, the bacterial agent is immiscible with the oil, but rather will gravitate therebeneath into the tank solution or onto the solid waste material. In the case of odor causing matter that is collected in a liquid medium, the bacteria remains in suspension in the aqueous layer, while in other cases, the bacteria is believed to concentrate on the unsubmerged waste matter where it receives nutrients as it carries out the process of degeneration.

The invention having been generally described, the following examples are given to illustrate embodiments of the invention, and are not intended in any way to limit the scope of the invention.

EXAMPLE I

A bacterial liquid concentrate is made by obtaining a culture or cultures of the desired bacteria and inoculating a solid nutrient medium such as agar therewith. The inoculated medium is maintained at suitable temperature and humidity conditions for the bacteria to grow and form spores. At this time larger slabs are inoculated therefrom and maintained under conditions suitable for growth of the bacteria. After the growth of the cultures has produced the desired quantity of bacteria, the spores are washed from the agar surface with water and accumulated in an aqueous suspension, which may be diluted to the desired concentration. The foregoing process is well known to those skilled in the art and needs no additional explanation.

The bacteria cultures used, however, are cultures of the species *Bacillus megaterium* and *Bacillus subtillis*, because of the relatively broad temperature scope experienced with this combination and other advantages heretofore discussed. Cultures of each species are available from biological supply companies, such as the Carolina Biological Supply Co. of Elon, N.C. where *Bacillus megaterium* and *Bacillus subtilis* are available as items 15–4900 and 15–4921 respectively. Other sources of the bacteria have been successfully used such as cultures isolated from nature and unidentified strains of the aforementioned species obtained from the Bacterial Stock Culture Collection, Indiana University, Bloomington, Ind.

Aqueous suspensions of spores of both bacteria are diluted to produce a bacterial liquid concentrate containing approximately equal amounts of *Bacillus megaterium* and *Bacillus subtilis* in a concentration totalling approximately $7.5 \times 10^8$ bacteria per gallon liquid.

EXAMPLE II

A deodorizing formulation is prepared by adding to a quantity of water, for example, 1 quart, the following:
   100 ml pecan oil
   300 ml amyl acetate
   120 ml methyl salicylate
   1 ml bacterial liquid concentrate of Example I
Additional water is added to dilute the formulation to a volume of 1 gallon.

For use in portable toilets, approximately ½ pint of the deodorizing formulation is added to the collection tank that has been precharged with approximately 5 gallons of water. The result thereby obtained has been the suppression and covering of odors existing therein and an accelerated decomposition of the waste matter accumulated therein to a form free of odor.

EXAMPLE III

A formulation for treating holding pits is prepared by adding to a quantity of water the following:
   200 ml pecan oil
   200 ml amyl acetate
   8 ml bacterial liquid concentrate of Example I
Additional water is added to dilute the formulation to a volume of 1 gallon.

Satisfactory results for the suppression of undesirable odors connected with holding pits used in connection with livestock and poultry housing buildings have been obtained by charging the holding pit with approximately 2 gallons of the aforementioned formulation before adding waste matter thereto, adding approximately 1 gallon halfway through the accumulation cycle and adding 1 additional gallon before pumping the accumulation from the holding pit for use as an organic fertilizer or the like.

EXAMPLE IV

A garbage container deodorizing formulation is prepared by adding to a quantity of water the following:

50 ml pecan oil
100 ml amyl acetate
1 ml bacterial liquid concentrate of Example I Additional water is added to dilute the formulation to a volume of 1 gallon.

Garbage collection containers and similar receptacles, particularly those containers in which organic waste matter is accumulated such as from restaurants, grocery stores and the like, have been successfully treated to reduce the undesirable odors connected therewith by spraying the container before and during accumulation of garbage therein with the deodorizing formulation according to Example IV.

While the preceding description and examples have disclosed specific embodiments with modifications of this invention in its preferred form, it is to be understood that various changes in detail and arrangement may be made without departing from the spirit and scope of the invention, the scope of the invention being defined in the claims.

What is claimed is:

1. A composition of matter useful in rendering organic waste odorless comprised of the following ingredients in admixture:
    a. a water-immiscible film-forming solvent carrier;
    b. water;
    c. a perfumant dissolved in said solvent carrier; and
    d. at least one type of aerobic, spore-forming bacteria belonging to Group I of the genus Bacillus suspended in said water.

2. The formulation according to claim 1 wherein said aqueous solution includes at least two types of said bacteria, each type having a growth temperature range different from the other, the temperature ranges for growth of each type overlapping the temperature range for the other type, and the combined growth temperature range defined by both of said bacterial types including from 68°–122° F.

3. The formulation according to claim 1 wherein said perfumants are selected from the group consisting of amyl acetate, methyl salicylate, benzyl acetate, coumarin, linalool, eugenol, camphor, isobornyl acetate, anthranilic acid, and betanaphthyl ethyl ether.

4. The formulation according to claim 1 wherein said carrier is an oil, film-forming solvent selected from the group consisting of vegetable oils and mineral oils.

5. The formulation according to claim 1 wherein said carrier further includes an emulsifier.

* * * * *